(12) United States Patent
Garceau et al.

(10) Patent No.: US 9,340,080 B2
(45) Date of Patent: May 17, 2016

(54) KINGPIN STABILIZER

(71) Applicant: Norco Industries, Inc., Elkhart, IN (US)

(72) Inventors: Bernard F. Garceau, Vandalia, MI (US); Bori Krobot, LaPorte, IN (US)

(73) Assignee: NORCO INDUSTRIES, INC., Elkhart, IN (US)

( * ) Notice: Subject to any disclaimer, the term of this patent is extended or adjusted under 35 U.S.C. 154(b) by 166 days.

(21) Appl. No.: 13/973,208

(22) Filed: Aug. 22, 2013

(65) Prior Publication Data

US 2014/0054427 A1     Feb. 27, 2014

Related U.S. Application Data

(60) Provisional application No. 61/692,172, filed on Aug. 22, 2012.

(51) Int. Cl.
| | | |
|---|---|---|
| *B60D 1/66* | (2006.01) | |
| *B62D 53/08* | (2006.01) | |
| *F16M 11/32* | (2006.01) | |

(52) U.S. Cl.
CPC .............. *B60D 1/66* (2013.01); *B62D 53/0871* (2013.01); *F16M 11/32* (2013.01)

(58) Field of Classification Search
CPC ....... F16M 11/04; F16M 11/16; F16M 11/32; B62D 53/0871; B62D 53/0857; B62D 53/0864; Y10T 74/2141; B60D 1/66
See application file for complete search history.

(56) References Cited

U.S. PATENT DOCUMENTS

| | | | | |
|---|---|---|---|---|
| 1,316,735 | A | * | 9/1919 | Olds .............................. 280/429 |
| 2,323,473 | A | * | 7/1943 | Korling ...................... 248/183.2 |
| 3,143,083 | A | * | 8/1964 | Gutridge et al. ................ 410/64 |
| 3,189,307 | A | * | 6/1965 | Peterson ......................... 410/61 |
| 4,199,123 | A | * | 4/1980 | Weber et al. ................... 248/168 |
| 4,268,066 | A | * | 5/1981 | Davis .......................... 280/763.1 |
| 4,548,418 | A | * | 10/1985 | Wendorff .......................... 280/1 |
| 4,570,887 | A | * | 2/1986 | Banister ...................... 248/187.1 |
| 4,596,371 | A | * | 6/1986 | Clark .......................... 248/354.3 |
| 4,641,729 | A | | 2/1987 | Beck et al. |
| 4,708,362 | A | * | 11/1987 | Raetz .......................... 280/763.1 |
| 4,905,953 | A | * | 3/1990 | Wilson .......................... 248/352 |
| 4,929,973 | A | * | 5/1990 | Nakatani .................... 248/177.1 |
| 4,949,809 | A | | 8/1990 | Levi et al. |
| 5,165,265 | A | | 11/1992 | Maionchi |
| 5,197,311 | A | * | 3/1993 | Clark .............................. 70/232 |
| D344,969 | S | * | 3/1994 | Nakatani ..................... D16/244 |
| 5,474,330 | A | | 12/1995 | Meehleder |
| 5,520,030 | A | * | 5/1996 | Muldoon .......................... 70/14 |
| 5,575,492 | A | | 11/1996 | Stone |

(Continued)

OTHER PUBLICATIONS

King Pin Tripod Stabilizing Jacks, BAL-Innovative Products for the RV Industry, Dec. 7, 2004.

(Continued)

*Primary Examiner* — Gary Hoge
(74) *Attorney, Agent, or Firm* — Vorys, Sater, Seymour and Pease LLP

(57) ABSTRACT

A kingpin stabilizer having a kingpin-retaining bracket having a base plate and upwardly extending walls along at least two sides of the base plate. The upwardly extending walls and the base plate forming a receiving cavity with the upwardly extending walls spaced apart to fit said kingpin therebetween. At least one upwardly extending wall has a pin retainer. The stabilizer includes three telescoping legs extending from the pin-retaining bracket forming a tripod.

13 Claims, 7 Drawing Sheets

(56) References Cited

U.S. PATENT DOCUMENTS

| | | | | |
|---|---|---|---|---|
| 6,062,524 | A * | 5/2000 | Jackson, Sr. | 248/352 |
| 6,109,078 | A | 8/2000 | Marshall | |
| 6,170,851 | B1 * | 1/2001 | Lindenman et al. | 280/434 |
| 6,334,279 | B1 | 1/2002 | Oliver et al. | |
| 6,695,348 | B2 | 2/2004 | Holly | |
| 6,739,559 | B2 * | 5/2004 | Nakatani | 248/187.1 |
| 6,910,666 | B2 | 6/2005 | Burr | |
| 2005/0110260 | A1 | 5/2005 | Jacques | |
| 2008/0267613 | A1 * | 10/2008 | Darrow | 396/428 |
| 2011/0011678 | A1 * | 1/2011 | Sheffield | 182/141 |

OTHER PUBLICATIONS

King Pin Stabilizing Jacks, BAL-Innovative Products for the RV Industry, Dec. 7, 2004.

King Pin Stabilizing Jack Model 25015 Assembly and Operating Instructions, BAL-Innovative Products for the RV Industry, 2000.

Twin Pin Stabilizing Jack Model 25038 Assembly and Operating Instructions, BAL-Innovative Products for the RV Industry, 2005.

King Pin Stabilizing Jack Model 25035 Assembly and Operating Instructions, BAL-Innovative Products for the RV Industry, 2000.

* cited by examiner

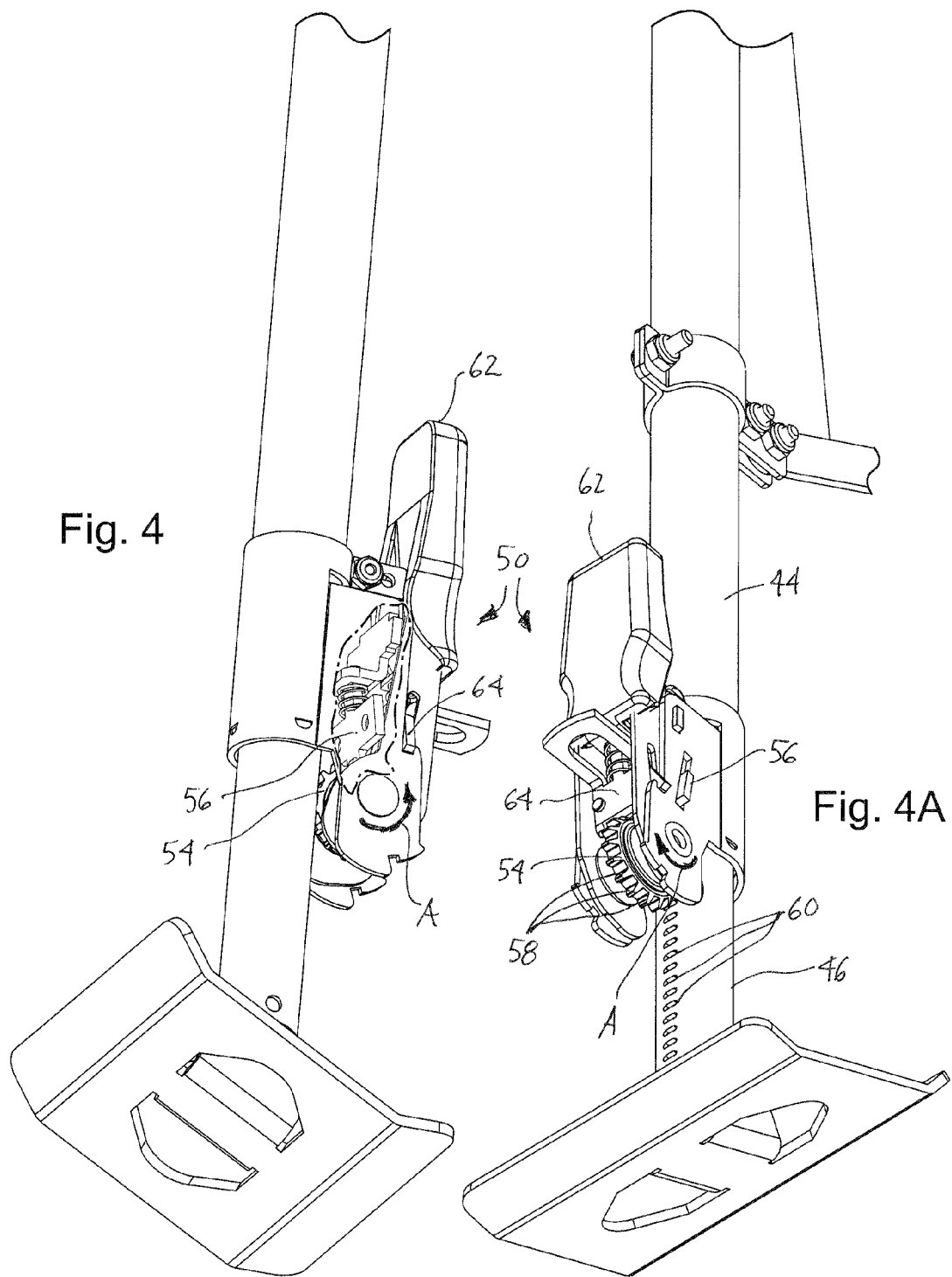

KINGPIN STABILIZER

CROSS-REFERENCE TO RELATED APPLICATIONS

This application claims priority to U.S. provisional patent application No. 61/692,172, filed Aug. 22, 2012, the disclosure of which is incorporated by reference herein in its entirety.

BACKGROUND AND SUMMARY

This invention relates generally to stabilizers for fifth-wheel or kingpin trailers.

Various types of recreational vehicles and other trailers are supported and stabilized after the recreational vehicle or trailer has been detached from the towing truck or vehicle.

Certain recreational vehicles and other trailers are coupled to the towing truck or vehicle using a fifth-wheel coupling. A fifth-wheel coupling includes a kingpin mounted to the front of the trailer positioned to engage a pin-receiving coupler, called a fifth wheel, on the rear of the towing vehicle. The fifth-wheel receives and retains the kingpin forming the trailer coupling. Typically, a portion of the trailer with the kingpin extends forward over a rear portion of the towing vehicle to engage the fifth-wheel. Thus, the front section of a fifth-wheel trailer extends in an unsupported and possibly unbalanced condition when the recreational vehicle or trailer is detached from the towing truck.

In the past, kingpin stabilizers were installed by setting the legs of a stabilizer on the ground, then raising a connection piece into place around the kingpin.

Disclosed is a kingpin stabilizer comprising a kingpin-retaining bracket and telescoping legs extending from the pin-retaining bracket.

A method of stabilizing a kingpin is disclosed comprising steps of engaging a kingpin-retaining bracket of a kingpin stabilizer onto a kingpin, and extending telescoping legs extending from the kingpin-retaining bracket forming a tripod beneath the kingpin such that each telescoping leg contacts the ground.

BRIEF DESCRIPTION OF THE DRAWINGS

FIG. 4 is a perspective view of a ratchet mechanism of the present kingpin stabilizer with a cut-away showing a spring-loaded lock plate of the mechanism;

FIG. 4A is another perspective view of the ratchet mechanism of FIG. 4;

DETAILED DESCRIPTION OF THE DRAWINGS

Figure 1:
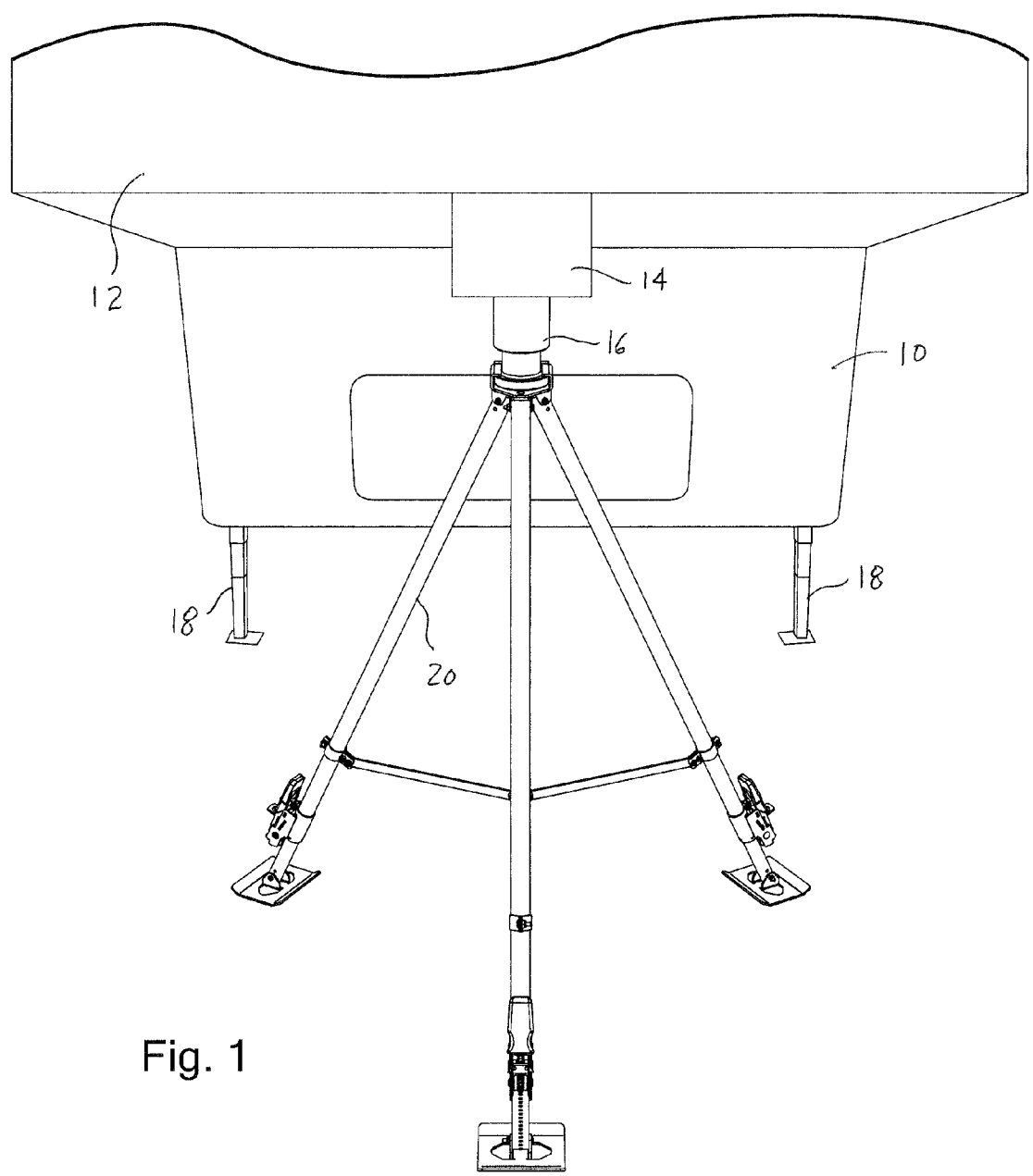
FIG. 1 is a partial front view of a kingpin stabilizer of the present invention attached to a kingpin of a trailer in an installed position.

A front view of a fifth wheel travel trailer 10 is shown in FIG. 1 having a front extension 12 extending forward at the front of the trailer 10. Typically, the trailer front extension 12 includes living quarters such as a bedroom or other space. Attached to the underside of the trailer front extension 12 is a pin box 14 that has a kingpin 16 attached to its underside. The kingpin 16 is used to connect the trailer 10 to a "fifth wheel" pin-receiving coupler in the towing vehicle (not shown).

Trailer 10 may include support extensions 18, usually one near each corner of the trailer 10. After the trailer 10 has been positioned in a parking space, the support extensions 18 may be lowered to the ground and used to level and support the trailer 10.

As shown in FIG. 1, after the trailer 10 has been unhitched from the towing vehicle, the trailer front extension 12 and front of the trailer may be stabilized using a kingpin stabilizer 20. The kingpin stabilizer 20 includes a kingpin-retaining bracket 22 and three telescoping legs 24 extending from the kingpin-retaining bracket 22 forming a tripod.

The present kingpin stabilizer 20 is attachable to the kingpin 16 prior to being extended to a desired length. By attaching the stabilizer 20 to the kingpin 16 before extending the legs, the top of the stabilizer is held in place, assisting the user in deploying the stabilizer quickly and easily.

In one alternative, the kingpin-retaining bracket 22 has a base plate 26 and upwardly extending walls 28 along at least two sides of the base plate 26. The upwardly extending walls 28 and the base plate 26 form a receiving cavity 30 having a size and shape adapted to receive a portion of the kingpin 16.

Typically, the kingpin 16 is a cylindrical pin with an annular groove 34 forming a kingpin head 36 at the outward end of the kingpin. The kingpin-retaining bracket 22 is configured to receive and attach to the kingpin 16 and may vary to accommodate different kingpin configurations. The kingpin-retaining bracket 22 includes one or more upwardly extending members that extend upwardly about at least a portion of a periphery of the kingpin 16 when the kingpin is installed. In the example shown, the upwardly extending members are positioned about three sides of the kingpin 16 when the kingpin is installed. The upwardly extending members may support one or more pin retainers that extend inwardly into the annular groove 34 to secure the retaining bracket 22 to the kingpin 16. In the example shown, the upwardly extending members are upwardly extending walls 28 of the kingpin-retaining bracket 22 spaced apart to fit the kingpin head 36 therebetween.

One or more of the upwardly extending walls includes a pin retainer 38. In the embodiment shown, the pin retainer 38 is a flange on each of the upwardly extending walls 28 oriented toward the receiving cavity 30, the flange 38 being offset from the base plate 26. Alternatively, the pin retainer 38 may be provided on two or more upwardly extending members. In yet another alternative, the pin retainer 38 may be provided on one upwardly extending member. In the embodiment shown, the flanges 38 are positioned to extend into the groove 34 of the kingpin 16 when the stabilizer 20 is installed on the kingpin. The pin retainer 38 may have other forms including but not limited to one or more set screw, clip, rod, pin, collar, or other retainer that extends into the annular groove 34 retaining the kingpin.

In one embodiment, the kingpin-receiving bracket includes a pin retainer in the form of one or more set screw, clip, rod, pin, bolt, collar, or combination thereof extending from one upwardly extending member inwardly to engage the kingpin groove 34 and retain the kingpin head 36 in the kingpin-retaining bracket. Alternatively, the kingpin-receiving bracket includes a pin retainer in the form of one or more set screw, clip, rod, pin, bolt, collar, or combination thereof extending from or between two or more upwardly extending members inwardly to engage the kingpin groove 34 and retain the kingpin head 36 in the kingpin-retaining bracket. In one example, the kingpin-receiving bracket includes two upwardly extending members forming a U-shaped bracket, with two pins or bolts extending between and constrained by the two upwardly extending members, each positioned to engage the groove of the kingpin in the U-shaped bracket on opposite sides of the kingpin, and at least one of the pins being removable for engaging and disengaging the kingpin.

Figure 3:
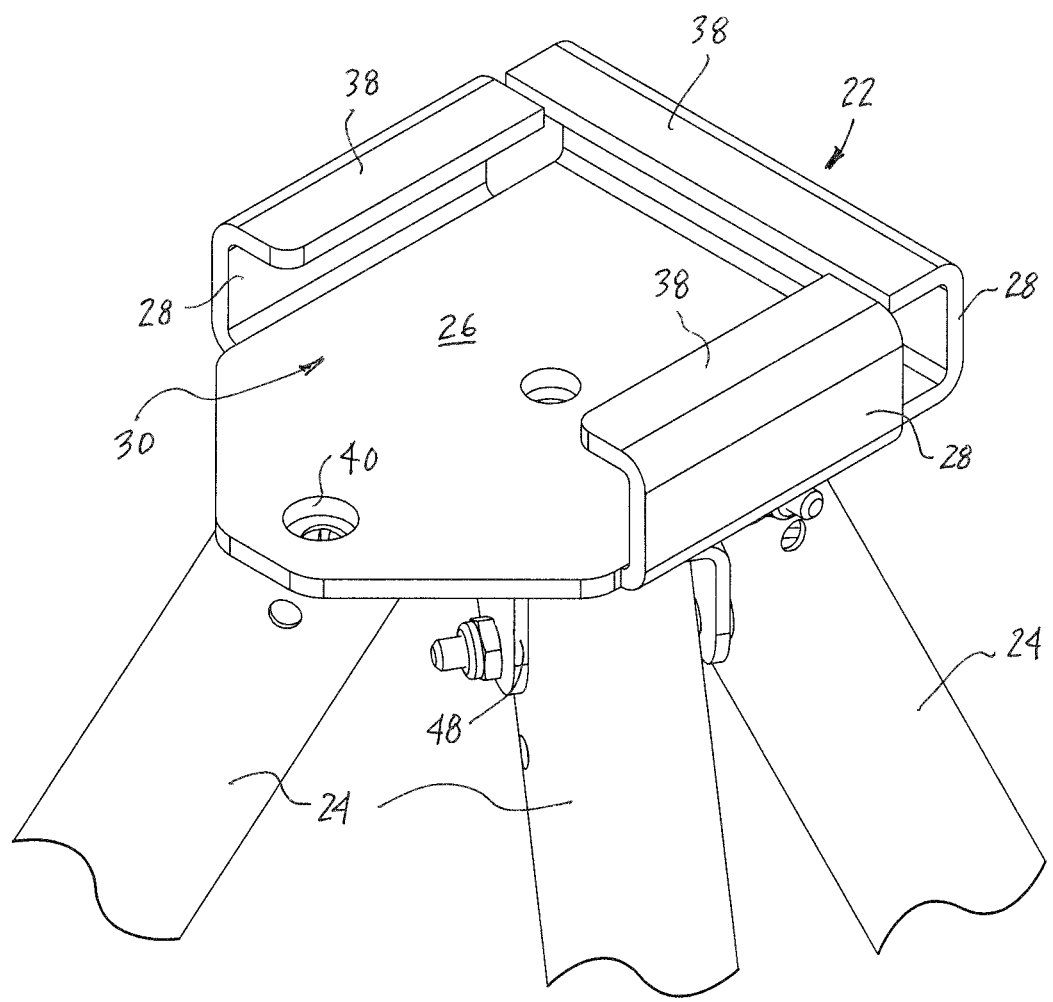
FIG. 3 is a perspective detail view of a kingpin-retaining bracket of the present kingpin stabilizer of FIG. 2.

As shown in FIG. 3, the kingpin stabilizer 20 may include upwardly extending walls 28 along three sides of the base plate 26. The three upwardly extending walls 28 and the base plate 26 form the receiving cavity 30. As shown in FIG. 3, the upwardly extending walls 28 are spaced apart to fit the kingpin in the receiving cavity 30 formed between the walls.

Figure 3A:
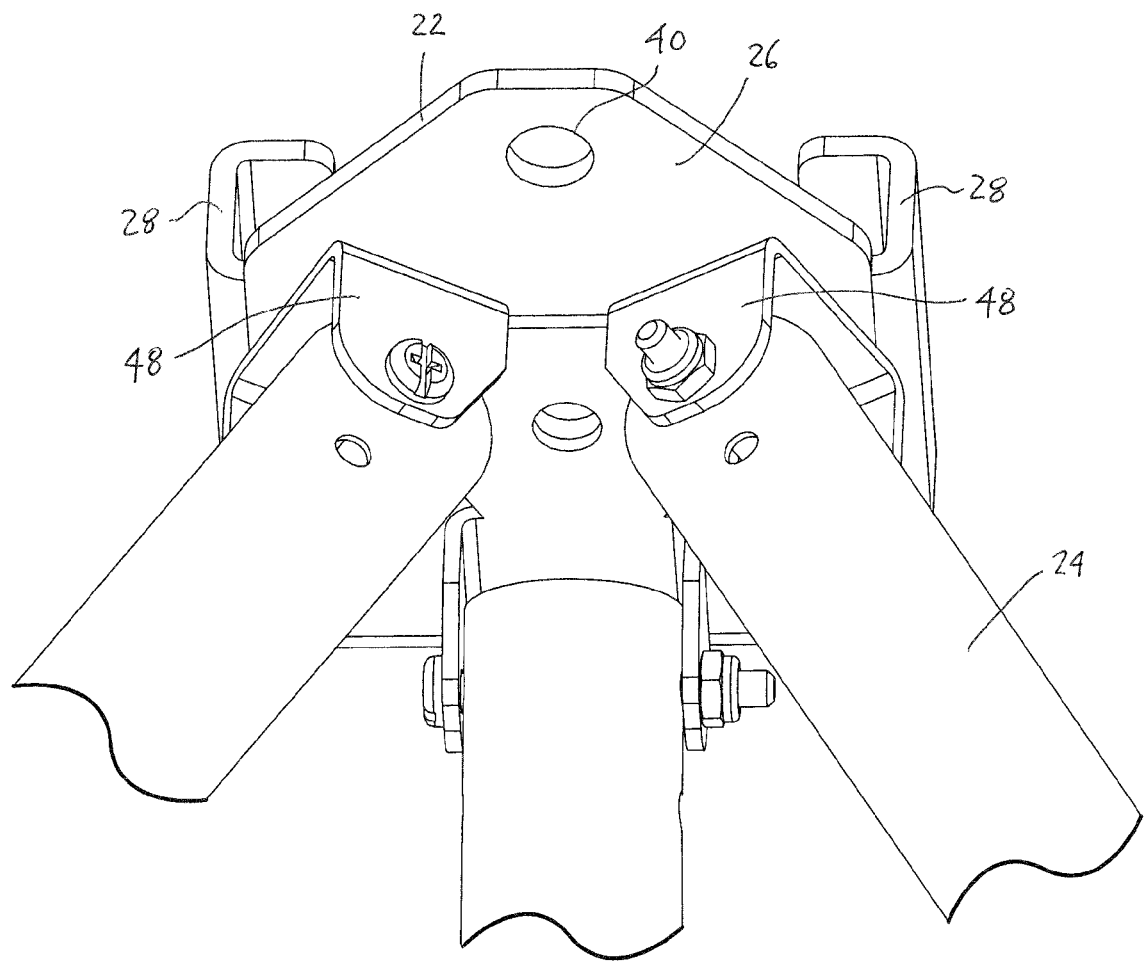
FIG. 3A is a perspective detail view of an underside of the kingpin-retaining bracket of FIG. 3.

The base plate 26 may include a lock aperture 40 adjacent the entrance to the receiving cavity 30, such as shown by example in FIGS. 3 and 3A. A padlock, snap clip, lock pin, pin, clip, or other retainer may be placed through the lock aperture 40 to hold the kingpin-retaining bracket 22 on the kingpin 16.

Figure 2:
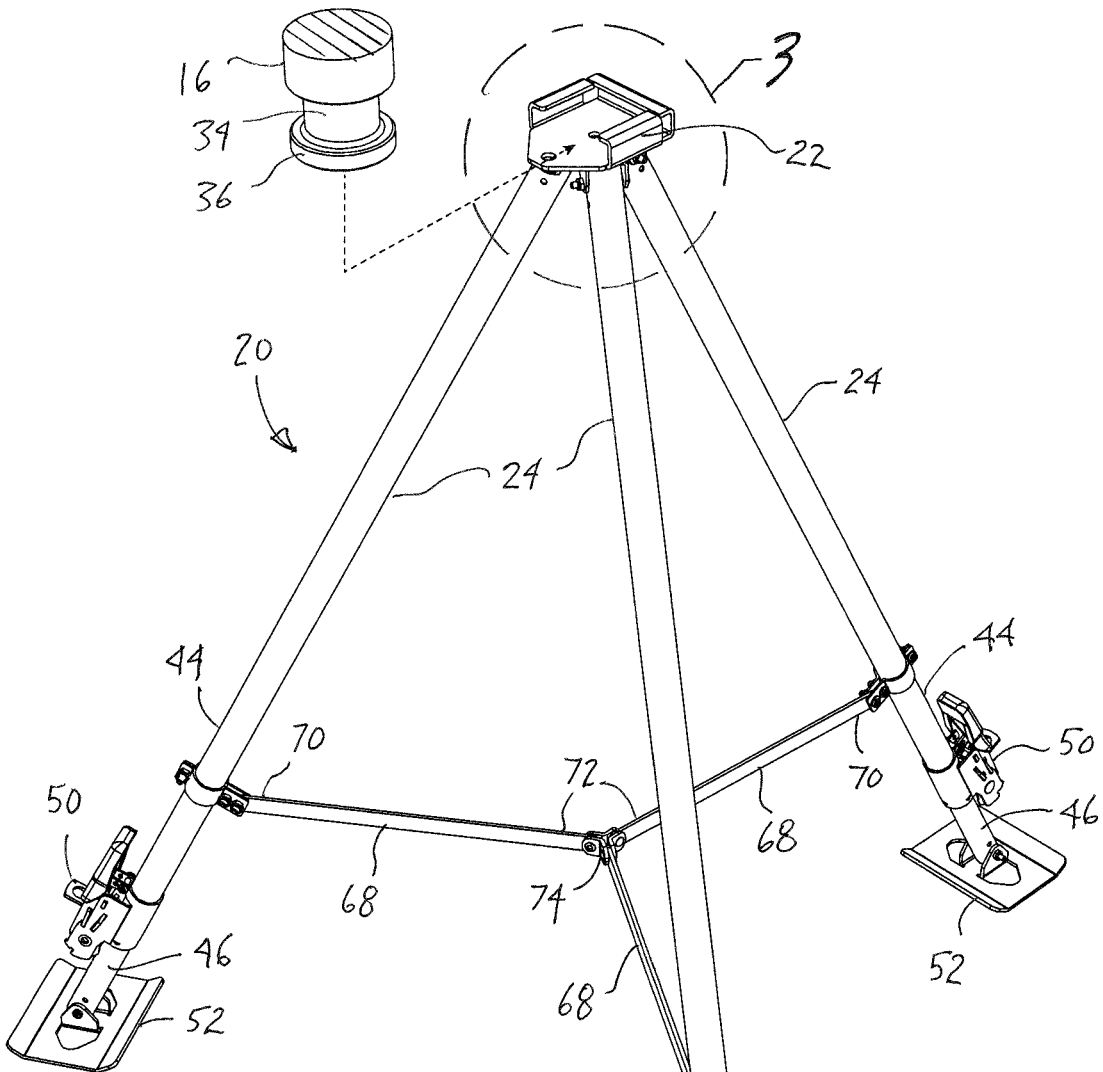
FIG. 2 is a perspective exploded view of the kingpin stabilizer of FIG. 1 in an un-extended position with a kingpin shown in an uninstalled position.
Figure 6:
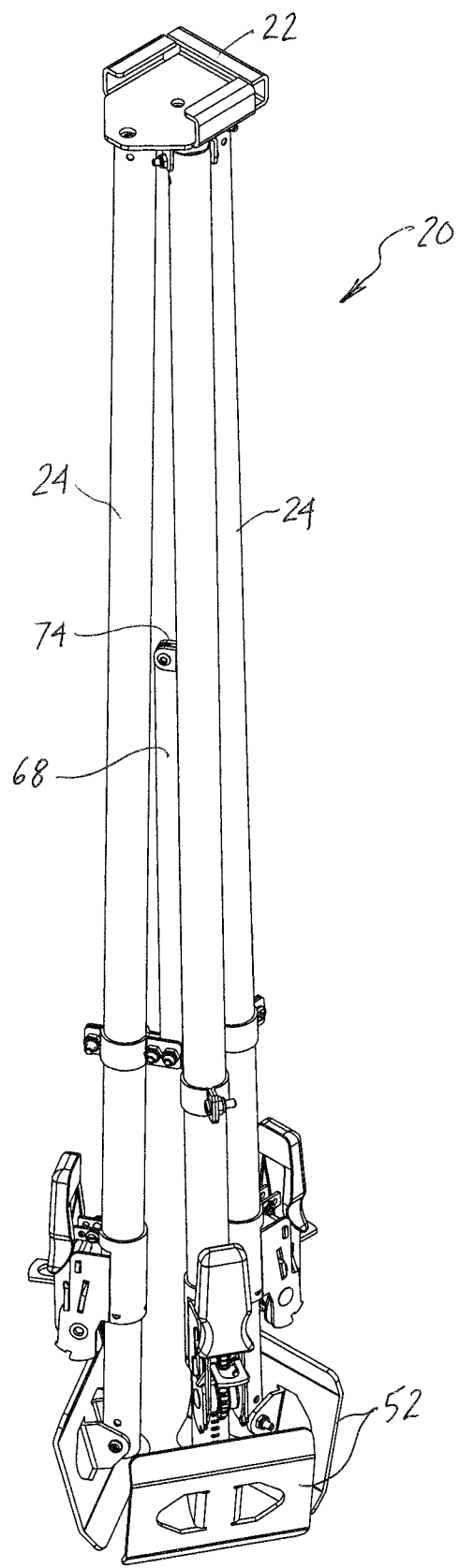
FIG. 6 is a perspective view of the kingpin stabilizer of FIG. 2 with legs in a storage position.

As shown in FIG. 2, the kingpin stabilizer 20 may also include a retaining bar 68 for each leg, each retaining bar 68 having a first end 70 pivotably connected to a respective telescoping leg 24 and a second end 72 pivotably connected to a center pivot 74. The legs 24 of the stabilizer 20 may be pivoted together for storage when not in use, the retaining bars 68 pivoting together positioned between the legs 24, such as shown in FIG. 6.

The telescoping legs 24 extending from the kingpin-retaining bracket 22 may include an outer tube 44 and a telescoping inner leg 46 slidably positioned within the outer tube 44. The outer tubes 44 are pivotably attached to the kingpin-retaining bracket 22. The kingpin-retaining bracket 22 may include a leg bracket 48 pivotably receiving the telescoping legs 24. The leg bracket 48 may be integrally formed with the kingpin-retaining bracket 22 or may be attached thereto. The outer tubes 44 may be connected to the kingpin-retaining bracket 22 using bolts, rivets, pins, or other axial fastener enabling pivotable movement of the outer tube. In the alternative shown in FIGS. 1 and 2, one or more of the telescoping legs 24 includes a ratchet mechanism 50 controlling the extension of the inner leg 46 from the outer tube 44. The inner leg 46 may be a tube. Alternatively, the inner leg 46 may be a rod. The cross-sectional shape of the telescoping legs 24 may be circular, square, rectangular, or any other arcuate, polygonal, or other cross-sectional shape as desired for the application. Each telescoping leg 24 may include a foot pad 52.

The ratchet mechanism 50 includes a ratchet wheel 54 operably engaging the telescoping inner leg 46. In one alternative, the ratchet wheel 54 includes a plurality of serrations or teeth 58 around the peripheral surface of the ratchet wheel 54 positioned to engage corresponding grooves or recesses 60 along the outer surface of the inner leg 46, such that rotation of the ratchet wheel 54 in a forward rotation, in the direction shown by the arrow in FIGS. 4 and 4A as reference "A," causes the inner leg 46 to extend from the outer tube 44, and rotation of the ratchet wheel 54 in a backward rotation causes the inner leg 46 to retract into the outer tube 44. The recesses 60 along the inner leg 46 are typically linearly arranged and spaced the same as the arc length tooth-to-tooth spacing on the ratchet wheel 54, operating similarly to a rack and pinion.

A spring-loaded lock plate 56 operably engages the ratchet wheel 54 resisting backward rotation of the ratchet wheel. The lock plate 56 includes a chamfered end on one side such that forward rotation of the ratchet wheel 54 engages a corresponding surface on the ratchet wheel teeth 58 acting as a cam to press the spring-loaded lock plate 56 against its spring away from the ratchet wheel allowing the tooth to advance past the lock plate in the forward direction. The shape of the lock plate 56 is such that movement of the ratchet wheel in backward rotation cannot cam the lock-plate out of the way so that movement of the ratchet wheel in backward rotation engages the teeth 58 of the ratchet wheel 54 against the lock plate 56 resisting backward rotation.

The ratchet mechanism 50 includes a lever 62 pivotable about the rotational axis of the ratchet wheel rotatable between a first position and a second position. The lever 62 includes a spring-loaded advance plate 64 slideable toward the ratchet wheel 54 to engage the ratchet wheel and slideable away from the ratchet wheel to disengage the ratchet wheel. When the advance plate 64 is in a position toward the ratchet wheel 54, the advance plate 64 engages the ratchet wheel 54 such that motion of the lever 62 in a first direction toward the lever first position rotates the advance plate 64 and the ratchet wheel 54 in forward rotation extending the telescoping inner leg 46. The spring-loaded advance plate 64 may be positioned to engage the teeth 58 of the ratchet wheel 54 and shaped with a chamfered end on one side so that forward rotation of the ratchet wheel 54, and motion of the lever 62 in a second direction opposite the first direction, engages a corresponding surface on the ratchet wheel teeth 58 acting as a cam to press the spring-loaded advance plate 64 against its spring away from the ratchet wheel allowing the tooth to advance past the advance plate in the forward direction. The shape of the spring-loaded advance plate 64 is such that motion of the lever 62 in the first direction, and movement of the ratchet wheel in backward rotation, cannot cam the advance-plate out of the way such that motion of the lever 62 in the first direction engages the teeth 58 of the ratchet wheel 54 against the advance plate 64 rotating the advance plate 64 and the ratchet wheel 54 in forward rotation.

Figure 5:
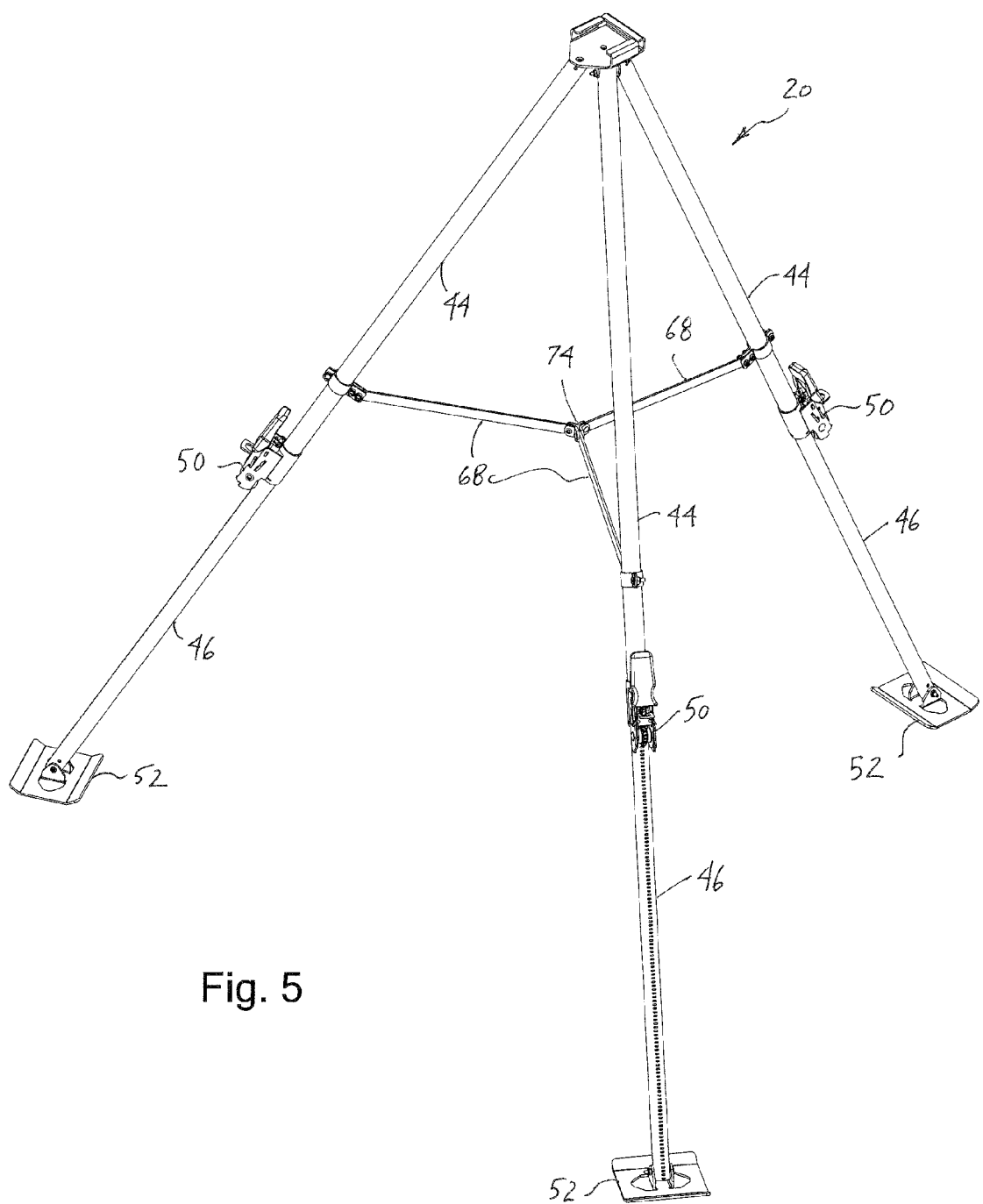
FIG. 5 is a perspective view of the kingpin stabilizer of FIG. 2 with legs extended.

The ratchet mechanism 50 may be used to extend the telescoping inner leg 46 by pressing the lever 62 in the first direction from the lever second position toward the lever first position to rotate the advance plate 64 and the ratchet wheel 54 in forward rotation extending the telescoping inner leg 46 an amount corresponding to the rotation of the ratchet wheel. Then, moving the lever 62 in the second direction opposite the first direction toward the lever second position while the ratchet wheel remains stationary to reengage the advance plate 64 against distal ratchet wheel teeth 58 for forward rotation. Then returning the lever 62 in the first direction toward the lever first position to rotate the advance plate 64 and the ratchet wheel 54 in forward rotation further extending the telescoping inner leg 46. The user may continue the ratcheting action until the telescoping inner leg 46 is extended a desired distance, such as shown in FIG. 5.

The spring-loaded lock plate 56 and spring-loaded advance plate 64 are positionable by a user to disengage the ratchet wheel 54 so that the telescoping leg can be extended or retracted without engagement of the ratchet mechanism. In one alternative shown in FIG. 4, moving the lever 62 in the second direction beyond the lever second position to a release position disengages the spring-loaded lock plate 56 and spring-loaded advance plate 64 from the ratchet wheel 54 so that the inner leg 46 is slideable into and out of the outer tube 44 without engagement of the ratchet mechanism. The spring-loaded lock plate 56 may include extending tabs engageable by a portion of the lever to disengage the lock plate when the lever is in the release position, and the spring-loaded advance plate 64 may include extending tabs engageable by a portion of the ratchet mechanism housing to disengage the advance plate when the lever is in the release position. In use, it is contemplated that a user may hang the unextended stabilizer onto a kingpin by the kinpin-retaining bracket, then disengage the ratchet mechanism to quickly extend the inner legs to reach the support surface below, such as the ground or other supporting surface. Then, use the ratchet mechanism to further extend the legs to raise the kingpin to a desired height and/or put the legs in a compression loading between the support surface and the kingpin.

The components of the kingpin stabilizer 20 may be made from any suitable structural material capable of supporting the tongue weight of the trailer including for example, metals, plastics, and composite materials. In the example shown, the stabilizer 20 is constructed of steel components. In certain applications, various components may be made from aluminum, such as but not limited to the kingpin-retaining bracket 22 and the inner leg 46. It is contemplated that the materials and dimensions of the kingpin stabilizer 20 are tailored to accommodate the weight of the trailer 10 and trailer loading exerted through the kingpin 16.

A method of stabilizing a kingpin may include hanging the stabilizer 20 from the kingpin and extending the telescoping legs to contact a supporting surface. The step of hanging may include engaging a kingpin-retaining bracket of a kingpin stabilizer onto the kingpin, where the kingpin-retaining bracket has a base plate and upwardly extending walls along at least two sides of the base plate, the upwardly extending walls and the base plate forming a receiving cavity, the upwardly extending walls spaced apart to fit the kingpin therebetween, each upwardly extending wall having a pin retainer. Then, the method including extending three telescoping legs extending from the pin-retaining bracket forming a tripod beneath the kingpin such that each telescoping leg contacts the ground.

The step of extending three telescoping legs may include moving a lever having a spring-loaded advance plate in a first direction, the advance plate engaging a ratchet wheel operably engaging a lower telescoping leg portion, the motion in the first direction rotating the advance plate and the ratchet wheel in forward rotation extending the lower telescoping leg portion.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A kingpin stabilizer comprising
   a kingpin-retaining bracket having a base plate and upwardly extending walls along at least two sides of the base plate,
   the upwardly extending walls and the base plate forming a receiving cavity,
   the upwardly extending walls spaced apart to fit said kingpin therebetween,
   at least one upwardly extending wall having a pin retainer extending inward therefrom to hang the kingpin retaining bracket on the kingpin, and
   three telescoping legs extending from the kingpin-retaining bracket forming a tripod.

2. The kingpin stabilizer according to claim 1, where the pin retainer is a flange on the upwardly extending wall oriented toward the receiving cavity, the flange offset from the base plate.

3. The kingpin stabilizer according to claim 1, where the upwardly extending walls are along three sides of the base plate, the three upwardly extending walls and the base plate forming the receiving cavity, the three upwardly extending walls spaced apart to fit said kingpin therein.

4. The kingpin stabilizer according to claim 3, where the base plate includes a lock aperture adjacent the entrance to the receiving cavity.

5. The kingpin stabilizer according to claim 1, where each telescoping leg comprises a ratchet mechanism.

6. The kingpin stabilizer according to claim 5, where the ratchet mechanism comprises a ratchet wheel operably engaging a telescoping leg portion,
   a spring-loaded lock plate operably engaging the ratchet wheel resisting backward rotation of the ratchet wheel, and
   a lever comprising a spring-loaded advance plate, the advance plate engaging the ratchet wheel such that motion of the lever in a first direction rotates the advance plate and the ratchet wheel in forward rotation extending the telescoping leg portion.

7. The kingpin stabilizer according to claim 1, further comprising a retaining bar for each leg, each retaining bar having a first end pivotably connected to a respective telescoping leg and second end pivotably connected to a center pivot.

8. The kingpin stabilizer according to claim 1, each telescoping leg comprising a foot pad.

9. A method of stabilizing a kingpin comprising the steps of:
   hanging a kingpin stabilizer from the kingpin;
   extending a portion of the stabilizer to contact a supporting surface, wherein the step of extending further comprises providing the kingpin stabilizer with three telescoping legs and extending the three telescoping legs downward from the kingpin-retaining bracket forming a tripod beneath the kingpin such that each telescoping leg contacts the supporting surface, and, where in extending the three telescoping legs includes moving a lever comprising a spring-loaded advance plate in a first direction, the advance plate engaging a ratchet wheel operably engaging a lower telescoping leg portion, the motion in the first direction rotating the advance plate and the ratchet wheel in forward rotation extending the lower telescoping leg portion.

10. A kingpin stabilizer for a kingpin having a kingpin head at an outer extremity thereof and defining a kingpin groove axially inward of the kingpin head, the kingpin stabilizer comprising:
    a kingpin-retaining bracket having a base plate and at least one upwardly extending member extending along three sides of the base plate to form a kingpin receiver that defines an open entrance and is configured to receive the kingpin head therebetween, the at least one member extending upwardly an extent sufficient to clear the kingpin head;
    a pin retainer extending inward from the at least one upwardly extending member, wherein the upwardly extending member and pin retainer combine to define a receiving cavity adapted to receive the head of the kingpin between the base plate and the pin retainer with the pin retainer extending into the kingpin groove to hang the kingpin retaining bracket on the kingpin; and
    a telescoping support extendable downward from the kingpin-retaining bracket to contact a supporting surface.

11. The kingpin stabilizer of claim 10, wherein the support is a tripod including three extendable legs pivotally attached to the kingpin retaining bracket.

12. The kingpin stabilizer of claim 10, wherein the pin retainer includes at least one flange extending inwardly from three sides of the at least one upwardly extending member, wherein the flange extends into the kingpin groove above the kingpin head on three sides of the kingpin head.

13. The kingpin stabilizer of claim 12, wherein the base of the kingpin retainer includes a portion extending forward of the entrance, the tab defining a lock aperture adjacent to the cavity.

* * * * *